(12) United States Patent
Yamamoto

(10) Patent No.: US 7,255,064 B2
(45) Date of Patent: Aug. 14, 2007

(54) AQUATIC ANIMAL EGG COLLECTION APPARATUS, AND METHOD OF USE

(76) Inventor: Mike Norihisa Yamamoto, 3461-A Akaka Place, Honolulu, HI (US) 96822

( * ) Notice: Subject to any disclaimer, the term of this patent is extended or adjusted under 35 U.S.C. 154(b) by 30 days.

(21) Appl. No.: 11/021,343

(22) Filed: Dec. 22, 2004

(65) Prior Publication Data

US 2006/0130771 A1    Jun. 22, 2006

(51) Int. Cl.
*A01K 63/00*    (2006.01)
(52) U.S. Cl. ..................................... 119/201
(58) Field of Classification Search ............... 119/201, 119/205, 206, 209, 213, 216
See application file for complete search history.

(56) References Cited

U.S. PATENT DOCUMENTS

| | | | | |
|---|---|---|---|---|
| 2,920,606 A | * | 1/1960 | Anderson | 119/206 |
| 3,604,395 A | * | 9/1971 | Huslin | 119/205 |
| 4,839,062 A | * | 6/1989 | Sanders | 119/205 |
| 5,839,216 A | * | 11/1998 | Baker et al. | 43/6.5 |
| 6,112,699 A | * | 9/2000 | Saxby et al. | 119/213 |
| 6,644,242 B2 | * | 11/2003 | Yamada | 119/206 |
| 2001/0035133 A1 | * | 11/2001 | Riverin | 119/201 |

FOREIGN PATENT DOCUMENTS

JP        04370051 A    * 12/1992

* cited by examiner

*Primary Examiner*—Thomas Price
(74) *Attorney, Agent, or Firm*—Kirk Hahn

(57) ABSTRACT

The collection of aquatic animal eggs during hatchery production is a critical step in the successful rearing of these animals. Currently, the equipment and culture methods do not allow large numbers of animals to be spawned at the same time without several people handling the process. The disclosed invention solves the problem of collecting large quantities of released aquatic animal eggs after spawning many adults at the same time. The apparatus is simple to build, maintain, and repair, and the method of its use requires only one person to handle the spawning of many adults.

15 Claims, 7 Drawing Sheets

AQUATIC ANIMAL EGG COLLECTION APPARATUS, AND METHOD OF USE

BACKGROUND OF THE INVENTION

This invention relates to an aquatic animal egg collector used for aquatic animals, such as, tropical fish, freshwater animals, saltwater animals, marine life, or aquacultured animals, to improve collection and removal of ova.

Worldwide, the aquarium products industry has grown in value in recent years to become an important component of international commerce. Like other industries involving the sale of live plants and animals, more restrictions are being placed on the collection of wild stock, and more emphasis being placed on the culture of stock already held in captivity.

Approximately 2,000 species of ornamental aquatic plants and animals are traded worldwide, 80% of which could be captive-bred. In 1995, it was estimated that the retail value for the industry worldwide was between 4 and 15 billion dollars, including all ornamental fish equipment, supplies and accessories. The number of tropical fish hobbyists worldwide can be counted in the millions.

The development of a viable tropical ornamental fish industry in the United States requires the development of techniques to breed a wide variety of tropical fish. Aquaculturists, employing a variety of livebearer traps and management techniques to separate adults and fry, have perfected methods to raise large quantities of livebearers. Unfortunately, the same cannot be said of egg layers, and more specifically, egg-scattering tropical fish. The obvious differences between the two groups, dictates that entirely different methodologies be developed to breed these fish. Traditionally, breeders use masses of natural or artificial plants, and/or spawning grids made of net like material to protect newly laid eggs. These techniques work well, but they have their limitations.

Present day breeding procedures for aquacultured animals used on fish farms and similar facilities commonly suffer from problems and disadvantages. They require intensive use of skilled labor, large space requirements and the use of time consuming techniques and procedures that result in low yields of offspring and a limitation on rearing certain species of animals.

Most culture facilities use similar methods to spawn the broodstock. The broodstock animals are commonly held in holding tanks of approximately 20 to 30 gallon capacity. Female broodstock have individual ovulation cycles, so it is necessary to determine which females are ready to spawn. This decision is made from the appearance of the female and it is an educated guess when the female is ready to spawn. This is both time consuming and requires a highly skilled technician to make an accurate assessment from his knowledge of the various species of fish. The broodstock animal is examined by the technician and the ones ready to spawn are removed from the holding tank. The selected broodstock are placed in a temporary container until transferred again to each spawning tank. The volume of these tanks will vary depending on the size of the aquatic animal.

Each spawning tank must be checked two or three times a day to see if spawning has begun. As soon as spawning is completed, carnivorous animals must be removed from the spawning tank to prevent cannibalism. The animals are again transferred to a temporary holding container and then back into its holding tank. The broodstock animals are handled at least four times during each breeding period.

After the eggs are spawned, they lie on the bottom of the tank and must be removed with a siphon hose or by pouring the tank water through a screen. These methods can damage the fragile eggs and reduce the number of viable offspring. Additionally, each tank must be handled. This becomes very labor intensive even with a small number of broodstock animals.

There are many disadvantages associated with the standard methods of spawning aquatic animals. There is great inefficiency with these methods because animals may be selected for spawning that are not ready to spawn, and conversely animals that are not selected may spawn in the holding tank and thus wasting the eggs.

The male of some species must be stimulated by the female before it is able to spawn. The selection of unresponsive or infertile males for spawning will result in the wasting of any spawned eggs. To prevent the loss of eggs, it is a common practice to place 2 or more males in a tank with a single female. Any male combined with a female is wasted for the entire period except for the short time when the female spawns. This practice is a waste of broodstock, time and space.

The bloodstock are usually not fed during the induction of spawning, since any uneaten food and fecal material will be a source for bacterial growth. However, the lack of food makes the broodstock animals hungry, which increases the possibly of the eggs being eaten before they can be collected.

Another disadvantage is the mortality associated with frequent handling of the broodstock animals. These animals are the most valuable individuals in a culture operation and their loss can cause major economic and business problems.

Another drawback with the current spawning methods is the need for many highly skilled technicians to handle the hatchery operation. The increased operating costs associated with paying higher wages for trained personnel and needing more employees to handle the labor-intensive procedures can become a major operating cost. These costs must be recovered by increasing the price for the product. If the skill level and number of employees needed to run the hatchery operation can be reduced, then these savings can be passed along to the customer in reduced prices.

There are many devices in the market designed to help culturists spawn livebearing aquatic animals; however, there are no comparable devices to spawn egg-scattering aquatic animals. The only items available are spawning slates/cones, and artificial spawning grass and mats to receive the eggs of substratum spawners.

The Aquatic Animal Egg Collection Apparatus will help the ornamental aquaculture industry expand and develop by providing ornamental fish culturists with an alternative way to produce egg laying tropical fishes. This is a critical segment of the industry that is deficient now.

To overcome the current disadvantages, an egg collection apparatus and method of using the apparatus has been developed to allow the broodstock animals to remain undisturbed in their holding tanks. A natural social arrangement between the males and females allows the maximum spawning of fertilized eggs and prevents the cannibalism of the eggs without having to remove the broodstock from the tank.

BRIEF SUMMARY OF THE INVENTION

A general description of the Aquatic Animal Egg Collection Apparatus is a device to collect the spawn of egg-scattering fishes.

The present invention provides an improved egg collection apparatus comprising a round, rectangular or square device with sloping surfaces to collect, protect and transfer the eggs to an egg concentrator apparatus that is free of parent fish. In the egg concentrator apparatus, the fish eggs are safe from predation and can be removed at the culturist's convenience for hatching and rearing.

The Aquatic Animal Egg Collection Apparatus allows aquatic animals to be spawned with minimal attention and handling by a culturist or attendant in a commercial operation. Moreover, in certain configurations, the eggs can be transferred directly into a rearing tank from the spawning tank without the need for operator attention. The egg concentrator apparatus is preferably a circular tube attached to the egg transporter apparatus of the aquatic egg collection apparatus. Eggs flow into the egg concentrator apparatus along with water and air from the egg transporter tube. Excess water flows back into the tank from the egg concentrator apparatus through a screened opening—the screen serving to retain the eggs. Excess air escapes the egg concentrator apparatus through the open top, or through a hole drilled through the top of the egg concentrator. In a commercial operation, the eggs can be transferred directly to another tank. A hole can be drilled through the side of the aquarium at the water line. The egg concentrator apparatus is removed from the end of the egg transporter apparatus, and the egg transporter apparatus extended through the hole in the glass. The water and eggs from the egg transporter apparatus is directed into a pipe or trough that can carry the eggs from a number of breeding tanks into a centralized hatching tank. In this commercial setup, the breeding tanks and hatching tanks are connected to a recirculating system, to filter and recirculate the water lost from the breeding tanks).

The disclosed Aquatic Animal Egg Collection Apparatus will help aquafarmers in several ways. It will allow aquafarmers to make better use of limited space by allowing them to group spawn many species of egg scattering tropical fish. In addition, it will facilitate the production of more difficult, higher value species, increasing the diversity of fishes produced by local aquafarmers. When used in conjunction with other labor saving measures, the Aquatic Animal Egg Collection Apparatus will improve the productivity of aquafarmers.

The Aquatic Animal Egg Collection Apparatus is used in the spawning of egg-scattering aquatic animal. As the name implies, these animals scatter their eggs in plants, or on the substratum. Fishes that spawn in this fashion include the Families Characoidei (characins or tetras), Cyprinidae (carp-like fishes) and Cyprinodontidae (egg-laying toothed carps). These are large groups of fishes, which currently contain more than 3,000 species, with more species being discovered every year. In terms of the aquarium trade, these three groups of fishes include hundreds of commercially important species. Examples include the neon tetra, zebra danio, tiger barb, Congo tetra, and White Cloud Mountain fish.

During spawning of fish, it is best to remove the eggs as soon as practicable from the tank because the parent will eat the eggs and cause a big reduction in the yield.

Most breeding tanks used for the spawning of aquatic animals are complex and not efficient in separating the eggs from the parent animal. Therefore, improvements are needed in the handling of spawned eggs. The aim is to assure a high yield of fish eggs without manually handling the eggs. The present invention satisfies this need for an improved tank system for collecting spawned eggs.

LIST OF INDIVIDUAL COMPONENTS OF EGG COLLECTION APPARATUS

Figure 1:
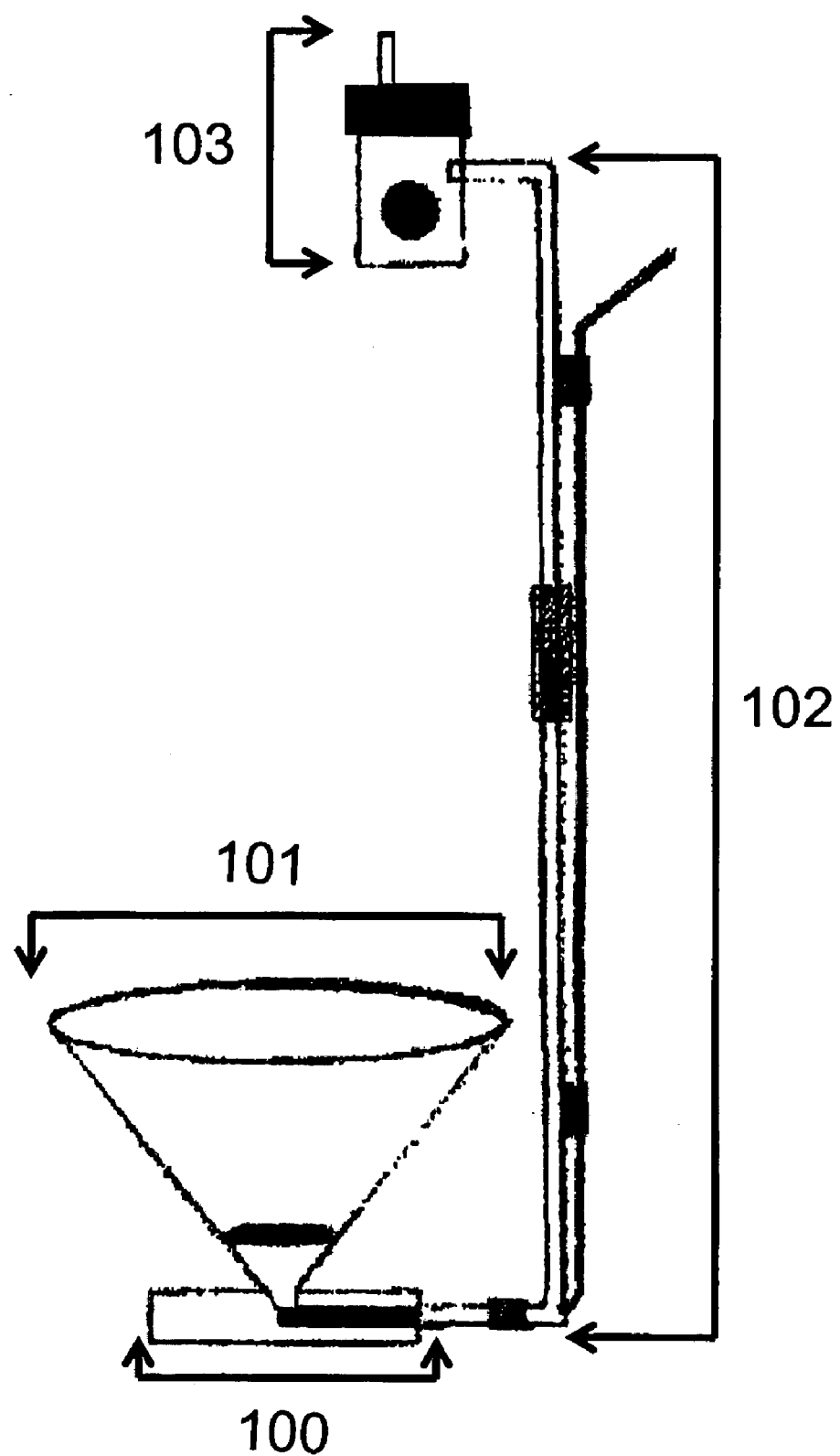
FIG. 1 illustrates a side view of an embodiment of the Aquatic Animal Egg Collection Apparatus showing the basic sub-units.

1. Weight
2. Screen disc to allow passage of eggs, but keep fish out
3. Egg collector apparatus—cone-shaped, sides sloped at approximately 45 degrees.
4. Airline
5. Egg concentrator container
6. Egg transporter tube
7. Inflow opening from egg transporter apparatus
8. Screened opening to allow water to flow back into tank, but retain eggs
9. Screw-on cap
10. Tube to allow excess air to escape
11. Lower section of egg transporter apparatus with holes drilled to allow eggs to be sucked into hollow tube. The end of the hollow tube is plugged with a cork, rubber stopper, or similar device.
12. Plug in proximal end of egg transporter apparatus with holes drilled at intervals along length near proximal end
13. Egg collector apparatus—box-shaped
14. Collar to mount egg concentrator apparatus onto egg transporter apparatus
15. Extension of egg transporter apparatus to allow passage of eggs and water
16. End cap
17. Proximal end of egg transporter apparatus with plug removed
18. Angled surface to direct eggs into proximal end of egg transporter apparatus
18'. Angled surface to direct eggs into proximal end of egg transporter apparatus
100. Weighted base
101. Egg Collector Apparatus
102. Egg Transporter Apparatus
103. Egg Concentrator Apparatus

DETAILED DESCRIPTION OF THE INVENTION

The following detailed description is provided to aid those skilled in the art in practicing the present invention. The description should not be construed to unduly limit the present invention as modifications and variations in the embodiments discussed herein can be made by those of ordinary skill in the art without departing from the spirit or scope of the present inventive discovery.

Figure 2:
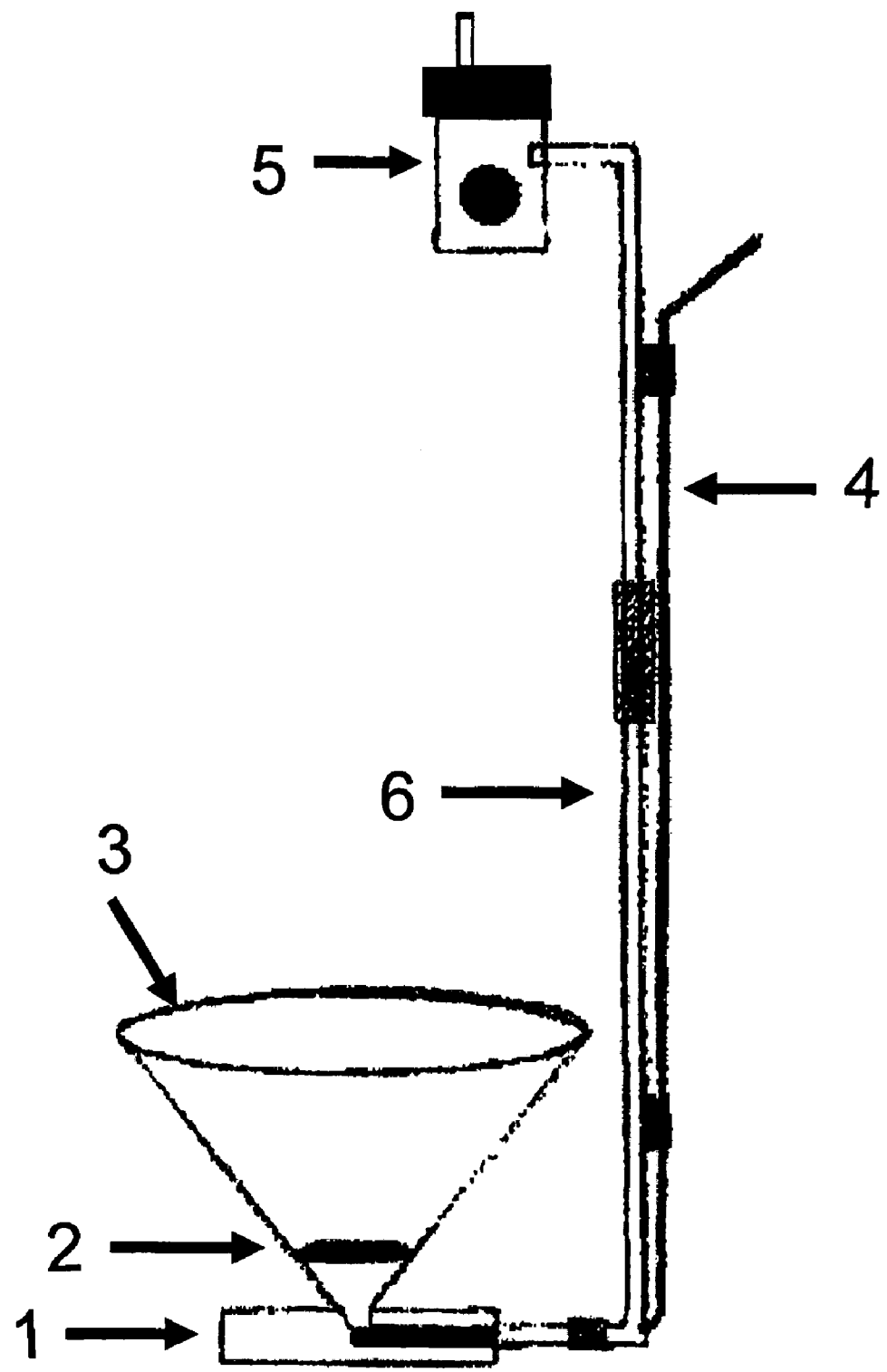
FIG. 2 illustrates a side view of an embodiment of the Aquatic Animal Egg Collection Apparatus showing the individual components.

The Aquatic Animal Egg Collection Apparatus comprises 3 sub-units: egg collector apparatus 101, egg transporter apparatus 102, and egg concentrator apparatus 103 (FIG. 1). Additionally, a weighted base 100 can be used to stabilize the Aquatic Animal Egg Collection Apparatus and keep it underwater. The egg collector container 3 is attached to a weight 1 that rests on the bottom of the aquatic animal rearing container (FIG. 2). There is a screen 2 across the egg collector container 3 near the bottom of the container to allow the eggs to pass through while protecting the eggs from predation or harm from the aquatic animals in the holding container. The screen 2 is above the proximal end of the egg transporter tube 6. The egg transporter apparatus tube 6 has its proximal end attached to the bottom or bottom end of the egg collector container 3 and has its distal end entering either the side 7 or bottom 15 of the egg concentrator container 5. An airline 4 enters near the proximal end of the egg transporter tube 6 to supply propulsion of the eggs and water to the egg concentrator 5 by airlift.

Figure 3:
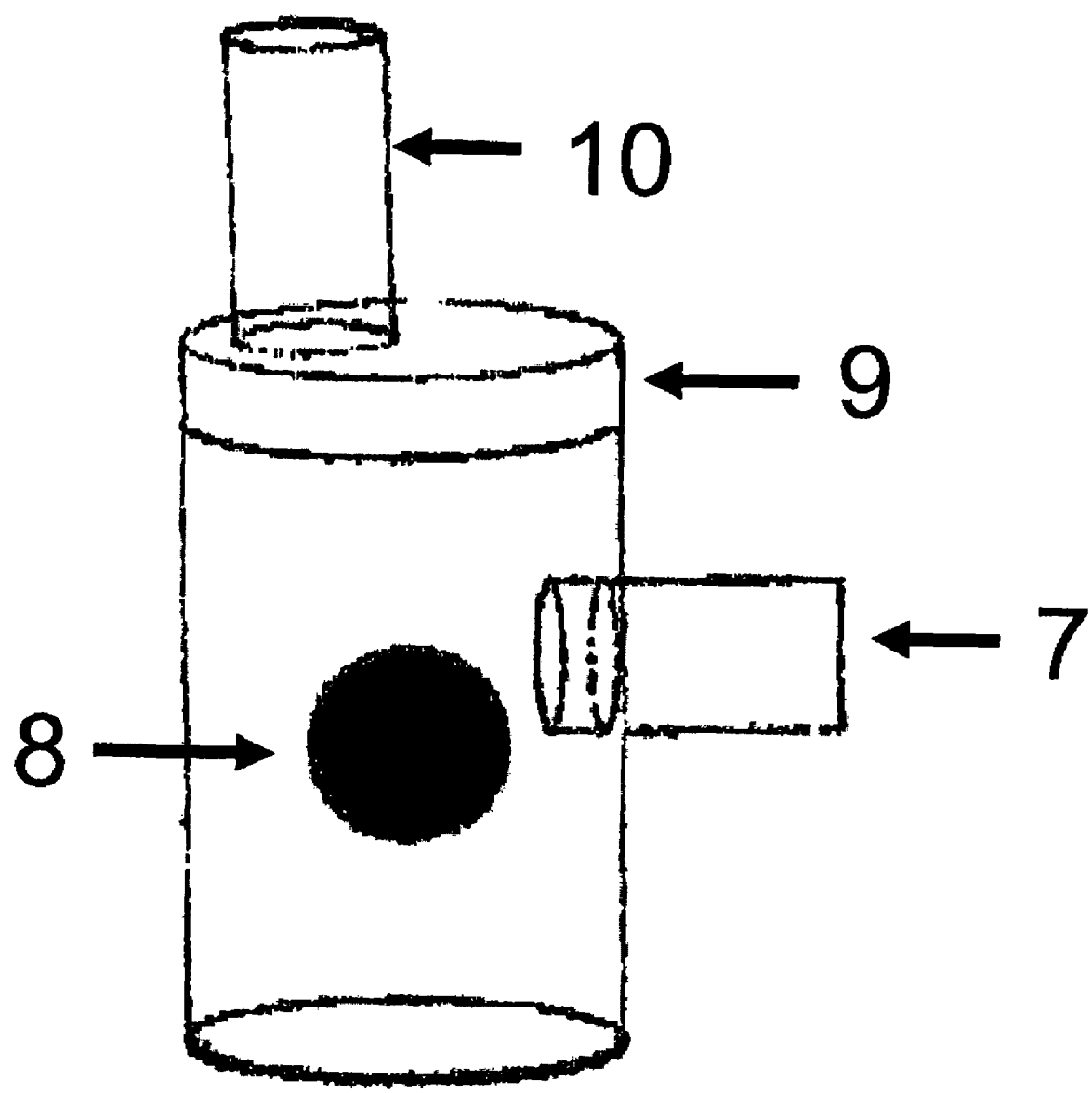
FIG. 3 illustrates a close-up view of an embodiment of the egg concentrator.

The distal end of the egg transporter tube 6 enters the egg concentrator container 5 through an inflow opening 7 (FIG. 3). The egg concentrator container 5 has a second opening on the side with a screen 8 to allow water to flow back into tank, but retain and concentrate the eggs. The top of the egg concentrator container 5 has a screw-on cap 9 with a tube 10 to allow excess air to escape.

Figure 4:
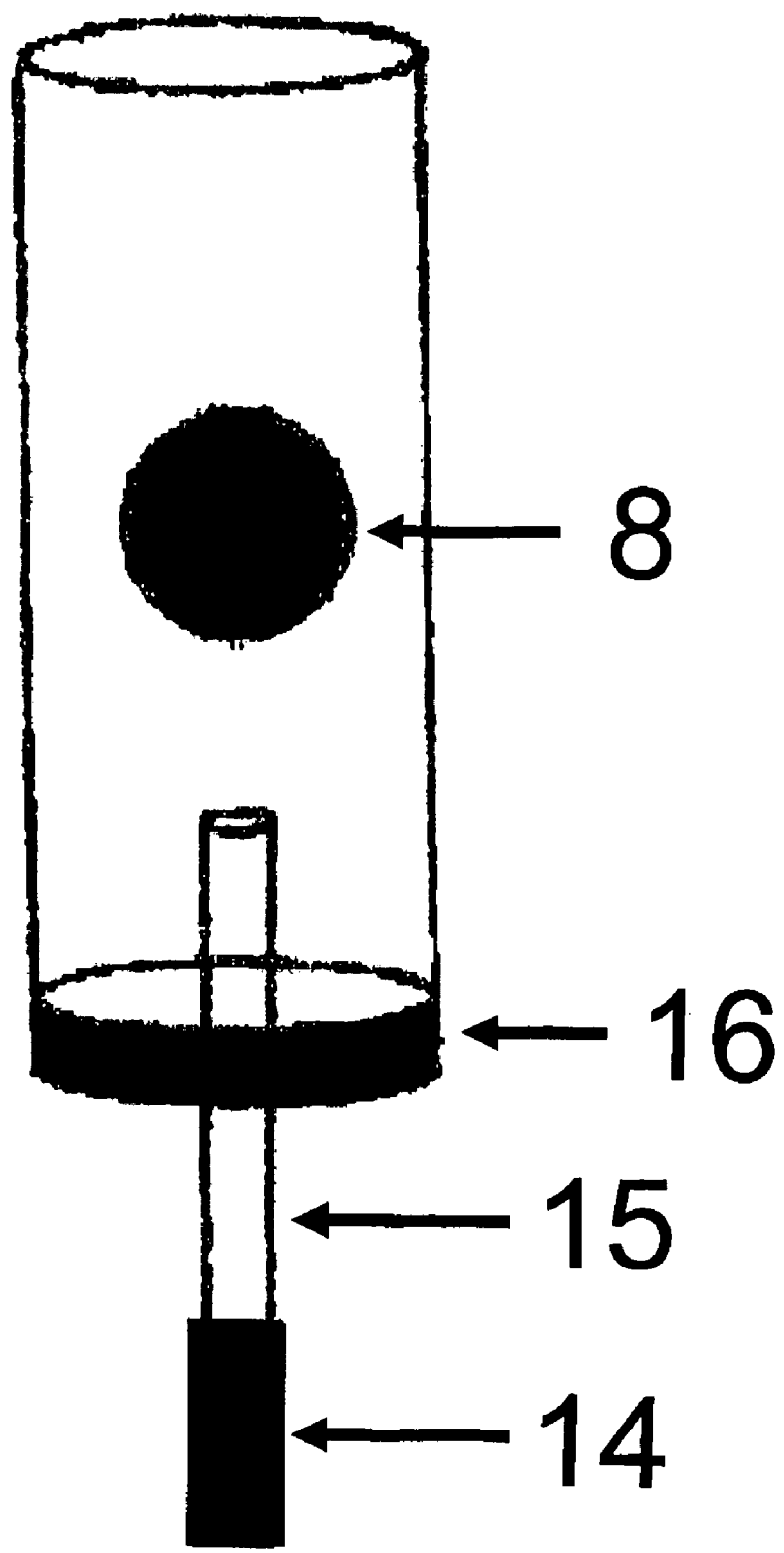
FIG. 4 illustrates a close-up view of an embodiment of the egg concentrator.

An alternative embodiment of the egg concentrator container 5 has the distal end of the egg transporter tube 6 attached by a collar 14 to tube 15 that goes through an end cap 16 (FIG. 4). The top of the egg concentrator container 5 is open so there is no need for a separate opening. The side of the egg concentrator container 5 has a screened opening 8 to allow for the return of the transported water to the animal holding container.

Figure 5:
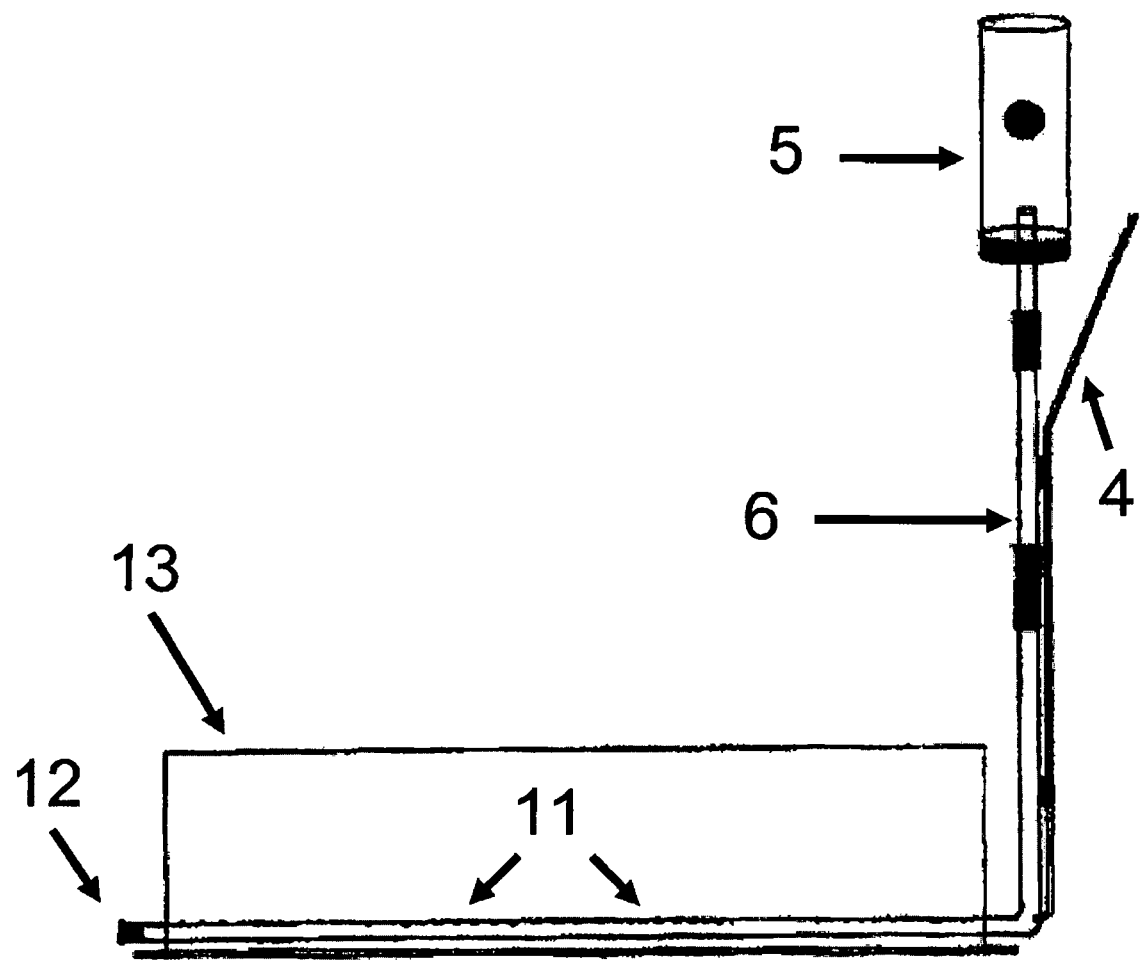
FIG. 5 illustrates a side view of an embodiment of the Aquatic Animal Egg Collection Apparatus showing the individual components.

The Aquatic Animal Egg Collection Apparatus can have many different embodiments depending on the size of the animal holding container, number of aquatic animals and size of the aquatic animals. FIG. 5 shows an embodiment with an increased area for egg collection. The egg collector container 13 is a polygon with straight sides rather than curved as in the egg collector 3 shown in FIG. 2. The proximal end of the egg transporter 6 does not connect at a central point in the bottom of the egg collector container 13, but rather it is plugged. Instead of having only one point for the eggs to enter the egg transporter tube 6, there are a plurality of holes 11 along the length of the tube near the proximal end. This configuration allows eggs to enter the tube at many locations and thus increase the surface area for collecting spawned eggs. The egg transporter tube 6, airline 4 and egg concentrator container 5 can be any of the possible embodiments.

Figure 6:
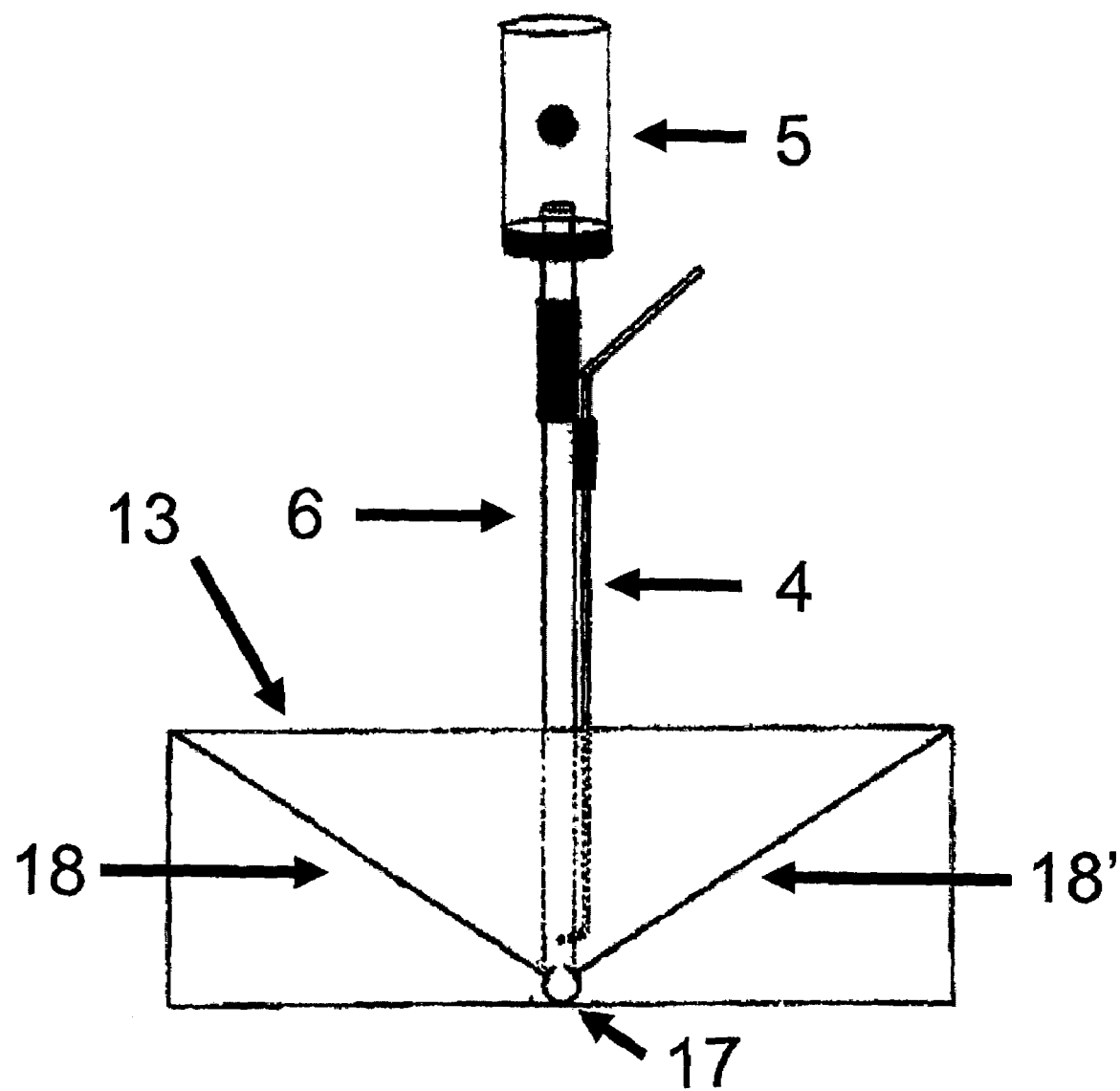
FIG. 6 illustrates an end-on view of the embodiment in FIG. 5 showing the individual components.

FIG. 6 shows the same embodiment from an end-on view. The proximal end 17 of the egg transporter tube 6 runs along the bottom groove formed by sides 18 and 18'. Sides 18 and 18' are angled to direct the spawned eggs that fall inside the egg collector container 13 to the bottom groove.

Aquatic Animal Egg Collection Apparatus

In one embodiment, the Aquatic Animal Egg Collection Apparatus comprises 3 parts: the egg collector apparatus 101, the egg transporter apparatus 102 and the egg concentrator apparatus 103. In another embodiment, the Aquatic Animal Egg Collection Apparatus is three separate pieces connected together. In another embodiment, the Aquatic Animal Egg Collection Apparatus is a single piece.

Figure 7:
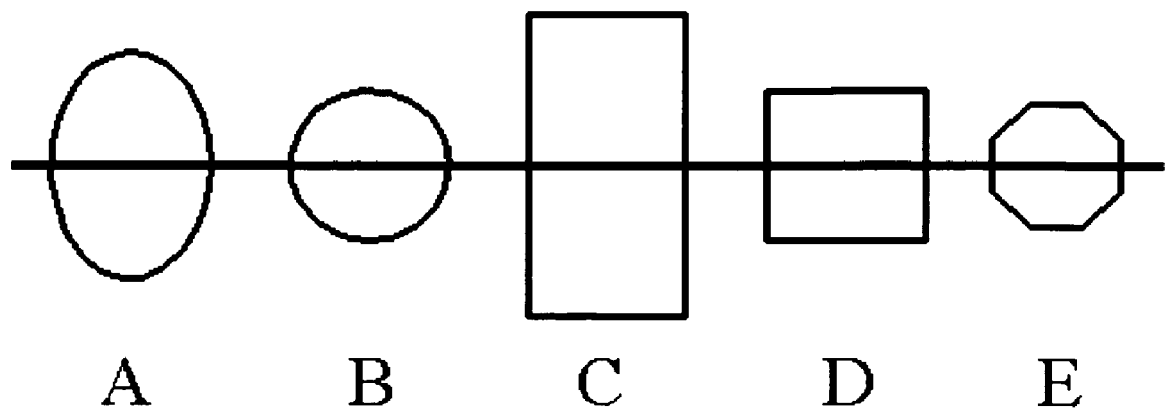
FIG. 7 illustrates the top view of various embodiments of the egg collector apparatus. The straight line shows the location of the cross-section view in FIG. 8. A-oval, B-round, C-rectangle, D-square and E-polygon

Egg Collector Apparatus:

A rectangular, round or square egg collector container is the preferred embodiment, and is the easiest to make or construct. Other embodiments include an oval, pentagonal, hexagonal and polygonal box with sloping sides (FIG. 7). The key features of the egg collector container are open top and sloped surfaces.

In one embodiment, the egg collector apparatus' top perimeter shape is a polygon. In a preferred embodiment, the egg collector apparatus' top perimeter shape is a polygon with a plurality of sides ranging from infinity to 5 sides. In a more preferred embodiment, the egg collector apparatus' top perimeter shape is a rectangle. In a more preferred embodiment, the egg collector apparatus' top perimeter shape is a rectangle with the length greater than its width or the width greater than its length. In the most preferred embodiment, the egg collector apparatus' top perimeter shape is a square.

In one embodiment, the egg collector apparatus' top perimeter shape is irregular. In a preferred embodiment, the egg collector apparatus' top perimeter shape is curved. In a more preferred embodiment, the egg collector apparatus' top perimeter shape is an oval. In the most preferred embodiment, the egg collector apparatus' top perimeter shape is a circle.

In one embodiment, the egg collector apparatus' shape is box, cube, prism, polyhedron, pyramid, cylinder, cone, and sphere, and inversions, angles from vertical and portions thereof. In a preferred embodiment, the egg collector apparatus' shape is wider at the top than at the bottom. In a more preferred embodiment, the egg collector apparatus' shape is an inverted cone. In the most preferred embodiment, the egg collector apparatus' shape is a funnel.

In one embodiment, the sides of the egg collector container are angled to a nadir. In a preferred embodiment, the sides of the egg collector container are angled from more than 0° to less than 90°. In a more preferred embodiment, the sides of the egg collector container are angled from more than 15° to less than 75°. In a more preferred embodiment, the sides of the egg collector container are angled from more than 30° to less than 60°. In the most preferred embodiment, the sides of the egg collector container are angled at 45°.

In one embodiment, the sides of the egg collector container are 90° for a portion and then angle to a nadir. In another embodiment, the sides of the egg collector container are curved. In another embodiment, the sides of the egg collector container are curved and form a section of a circle. In another embodiment, the sides of the egg collector container are curved and form a section of an oval. In another embodiment, the sides of the egg collector container are about 90° for a portion, then angle, but before reaching the nadir, the bottom is flat.

Figure 8:
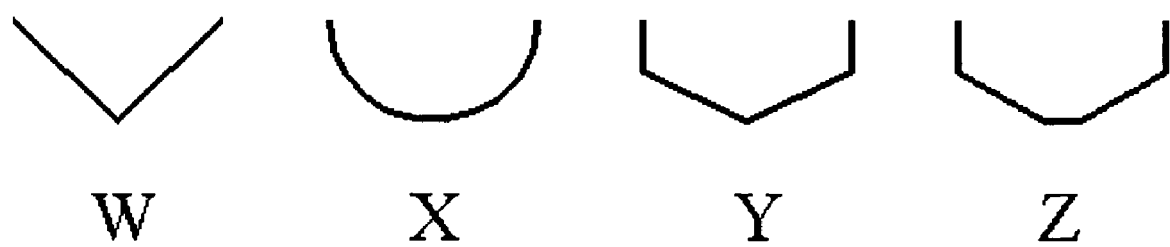
FIG. 8 illustrates the cross-sectional horizontal view (located at the straight line in FIG. 7) of various embodiments of the egg collector apparatus. W-straight sides, X-curved sides, Y-vertical for a portion and then straight to the nadir, and Z-vertical for a portion, then straight for a portion until a flat bottom.

The egg collector container 3 can be of any shape or size that is appropriate for the fish rearing container, size of fish or spawned egg. The upper surface of the egg collector container 3 is open and the perimeter of the opening can be any shape from oval, round, square, rectangular, polygonal or irregular. The sides of the egg collector container are sloped as to allow the maximum surface area of the opening while forcing the eggs to fall to the nadir at the bottom (FIG. 8). A screen 2 optionally can be placed above the nadir to prevent fish in the rearing container from eating the released eggs. The egg collector container can be optionally attached to a weighted base 1 to prevent movement of the egg collector 3.

Egg Transporter:

The preferred embodiment of the egg transporter apparatus is a hollow round tube. Other preferred embodiments of the egg transporter apparatus use square, rectangular or any hollow pipe. Another embodiment of the egg transporter apparatus is a small water pump to push water up the egg transporter tube or a suction pump to pull water and eggs up the egg transporter tube.

The egg transporter apparatus 102 is a hollow tube 6 connected to the opening at the nadir of the egg collector 3. The eggs gather at the nadir of the egg collector container and fall into the proximal opening of the egg transporter apparatus.

An airline 4 is inserted part of the way between the proximal and distal ends of the egg transporter tube and sealed to prevent water from leaking out of the tube.

The preferred embodiment is an airlift means from an air stone in the tube to move the eggs from the egg collector container to the egg concentrator apparatus through the egg transporter apparatus. An airlift is a simple method that is 100 percent reliable (no moving parts) and easy to design.

An air pump causes air to flow out of the air hose, forming bubbles, and generating water flow from the proximal end to the distal end. The water flow forces the free eggs to travel with the water to the egg concentrator.

An alternative method for moving the eggs from the proximal end to the distal end and eventually into the egg concentrator is to pump water through the egg transporter tube causing suction from the proximal end. Another alternative method for moving the eggs from the proximal end is to have suction at the distal end, which will cause a water flow into the egg concentrator.

Air pumps, water pumps (either pushing into or sucking water out of), or other methods of causing water movement inside the egg transporter apparatus tube are, in general, called propulsion devices.

The egg transporter tube should be adjustable in height to accommodate tanks of different heights.

Egg Concentrator:

The primary purpose of the egg concentrator is to contain and concentrate the eggs to make it easy to transfer the eggs to a hatching container. In one embodiment, the egg concentrator is a container of any shape with openings to bleed off the air and remove the water coming in via the egg transporter tube. The opening to bleed off the air is on the top, and the opening(s) to remove the excess water is on the side. The openings to remove the water are screened to prevent the eggs from also flowing out. In another embodiment, the egg concentrator is a large tube that is positioned on top of the egg transporter tube.

The Aquatic Animal Egg Collection Apparatus has applications in a commercial fish hatchery. In a fish hatchery, the egg transporter tube may be linked to a central collection system, rather than to an individual egg concentrator container. In this embodiment, a hole is drilled through the side of each aquarium, just above the water line. The distal end of the egg transporter tube is passed through the opening and is attached to a common tube directing the outflow from several tanks to a centralized tank for egg concentration and hatching. In this way, a battery of tanks with shared Egg Collector containers can be set-up to mass spawn the same species of fish. In this embodiment, the spawning tanks are part of a centralized water recirculating system, so the water carried away by the egg transporter system is recovered and replaced.

Another embodiment is an open-ended Egg Concentrator container. This concentrator is a large diameter plastic tube, which sits on the top of the egg transporter tube. The tube is longer than the usual container and open on the top, which allows the excess air to escape through the open end of the tube. Holes are cut through the side of the tube to allow water to escape. The holes are screened to retain the eggs.

Typically, the Aquatic Animal Egg Collection Apparatus will be used by itself in a single tank. The water, which is carried up by the egg transporter tube into the egg concentrator, returns to the tank by simply flowing out through screened openings cut into the egg concentrator container. Excess air bleeds off through a hole cut into the cover of the egg concentrator. Typically, a short section of hollow tubing is attached to the air bleed off hole simply to bleed the excess air off above the water's surface to prevent bubbling/splashing.

Other Embodiments

It is to be understood that while the invention has been described in conjunction with the detailed description thereof, the foregoing description is intended to illustrate and not limit the scope of the invention, which is defined by the scope of the appended claims. For example, although the above description relates to eggs of ornamental fish species, various aspects of the invention might also be applied to eggs from other aquatic animals, both invertebrates [e.g.; crustaceans (shrimp, lobsters, crabs, etc.), molluscs (clams, oysters, abalone, mussels, etc.)] and vertebrates [e.g.; cultured food fishes]; by making appropriate modifications to the described methods. Other aspects, advantages, and modifications are within the scope of the following claims.

EXAMPLES

The following examples describe embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims, which follow the example.

Several species of commercially important tropical fishes, including *Synodontis petricola* and *Lamprichthys tanganicanus*, were tested with the Aquatic Animal Egg Collection Apparatus. Some of these fish were Emperor tetras, red emperor tetras, Congo tetras, neon tetras, white clouds, zebra danios, and Tanganyikan Pearl Killifish, Example 1

Experiments were conducted to fine-tune and modify the Aquatic Animal Egg Collection Apparatus to maximize its effectiveness. A wide range of commercially important egg laying species of tropical fish were tested with this device, and modifications were made as necessary to improve its effectiveness.

The Aquatic Animal Egg Collection Apparatus was first developed to spawn *Synodontis petricola*, an African catfish from Lake Tanganyika. As a group, *Synodontis* catfish are highly valued and not much is known about their breeding behavior. As a result, most of the *Synodontis* catfish in the trade are wild caught and therefore expensive.

Some of the first breeding successes for *S. petricola* were reported about three years ago. It was discovered that *S. petricola* deposited its eggs in caves by egg-scattering. Culturists were using clay flowerpots with a hole or notch cut out of it. The flowerpot was inverted over a dish of marbles. The fish would enter the flowerpot and scatter their eggs. The purpose of the marbles was to protect the eggs from the parent who would eat them.

The problem with this set-up was that one would have to remove the flowerpot and check the dish of marbles to see if the fishes had spawned. Not only did this disrupt the animals, but it also was very inconvenient. Once disturbed, the animals would take a while to assume their normal behavior.

In an attempt to eliminate these problems, an egg transporter device was used to remove the eggs from the clay flowerpot. A funnel was used to channel the eggs into a collection area where the egg transporter tube would be located. A piece of netting stretched over the mouth of the funnel served to eliminate predation of the eggs. Finally, to concentrate and isolate the eggs, an egg concentration device was placed at the other end of the egg transporter tube. This is the basic configuration of the Aquatic Animal Egg Collection Apparatus.

This apparatus worked very well (FIG. 1). A check of the egg concentrator for eggs was able to determine if the fishes had spawned. If eggs were present, the egg concentrator was removed and the eggs poured out.

In general terms, the Aquatic Animal Egg Collection Apparatus consisted of three basic components: 1) an egg collector with sloped surfaces to direct the eggs to a central collection point; 2) an egg transporter apparatus to move the eggs from the collection point to the egg concentrator, and; 3) an egg concentrator container to collect the eggs for removal and hatching.

The Aquatic Animal Egg Collection Apparatus can be constructed in any shape and size. The three basic design requirements described above; however, means that certain shapes, sizes and configurations were more practical and feasible than others. For example, in a round or circular tank, a funnel provided the needed sloped surface. Similarly, in a rectangular-shaped tank, any open topped polygonal container with flat or curved sides at the proper angle provided the sloped surfaces.

The size of the Aquatic Animal Egg Collection Apparatus varied depending on the size of the holding tank, and number, age, size and species of fish. A circular or funnel-shaped Egg Collector container was usually used in a 20-gallon tank to breed small species of tropical fish, such as, the zebra danio and emperor tetra. The larger, rectangular-shaped container was used in 55-gallon tanks to breed large, more active species, such as, the Congo tetra.

There were several trade-offs that had to be considered when selecting the design of the Egg Collector container. The angles of the sloped surfaces and the size or opening of the device were inversely related. A steeper angle made the opening of the device smaller. Preferably, the slope was greater than 30 degrees so the eggs rolled down into the collection area, but lesser angles were still possible with some species. Steeper was better, but the steeper the angle, the smaller the opening of the egg collector.

An additional consideration was the height of the Aquatic Animal Egg Collection Apparatus. Most egg-scattering fishes spawn close to the bottom. It was important, therefore, for the Aquatic Animal Egg Collection Apparatus to be as low as possible. The invented device has a relatively large opening or spawning area, steeply sloping egg collection surfaces and a low profile.

Example 2

Spawning trials with some of the larger, more active species, such as, the Congo tetra and the Tanganyikan Pearl Killifish resulted in the development of a larger, rectangular shaped Egg Collector container. In this embodiment, the sloped sides of the funnel were replaced by two flat pieces of Plexiglas attached to a Plexiglas box at an angle of 30 degrees or greater. The egg transporter tube was bent into the shape of an "L", and the horizontal section was along the bottom in the gap formed by the two angled pieces of Plexiglas. Holes were drilled into this section of the tube at ½" intervals providing a way for the eggs to pass into the egg transporter tube.

The two collecting plates were attached at an angle of 30 degrees. This proved satisfactory for species with large eggs, such as, the Tanganyikan Pearl Killifish. Smaller eggs, such as those produced by the emperor tetra, needed a steeper angle since this slope was not steep enough to cause all of the eggs to roll down into the egg transporter tube. In the second rectangular device, the plates were angled at 40 degrees. This was an improvement, but the surface area had to be reduced to keep the Egg Collector container at a reasonable height.

Example 3

Improvements were made to the original funnel shaped Egg Collector apparatus. In the first two devices, a clay flowerpot and a small plastic bucket were used to hold the funnel upright. These devices proved to be unwieldy, so the weighted plastic base of a Hydrosponge filter was modified to hold a funnel. These devices were much more streamlined and easier to use.

Early versions of the funnel-shaped Egg Collector apparatus used plastic funnels. These funnels were fabricated from an opaque plastic material. Two embodiments of the funnel-shaped Egg Collector apparatus were developed. The larger one, with an opening measuring 8" in diameter, had sides sloping at an angle of 45 degrees. A slightly smaller device with a steeper slope of 60 degrees was also constructed. A big advantage was constructing both of these devices from Plexiglas. Both devices were constructed with clear Plexiglas, which made observation possible of any collected and accumulated eggs.

Example 5

By varying the type of spawning media used, different species of egg-scattering fishes can be bred. For example, placing an inverted clay flowerpot with an entrance hole cut out over the funnel shaped Egg Collector container produced conditions conducive to the spawning of *Synodontis petricola*. As mentioned earlier, *S. petricola* scatters its eggs in cave-like structures. The inverted flowerpot substitutes for a cave. The eggs were released by the fish, fell through the grid, and then were pulled out by the egg transporter tube and went into the egg concentrator.

Example 6

In the wild, the Tanganyikan Pearl Killifish, *Lamprichthys tanganicanus*, deposits its eggs individually in rock crevices. In aquaria, this species has been spawned in several different ways. Nylon spawning mops typically used to spawn killifish are often used to spawn this species. However, the mops had to be frequently checked. An additional problem is that *Lamprichthys* eggs are not adhesive, nor do they have a filament to allow the eggs to hang onto the nylon fibers. These eggs therefore have a tendency to fall out of mops.

A second method uses several rocks piled in a shallow plastic pan, duplicating the natural conditions found in the lake. To collect the eggs, the pan and/or rocks must be removed about once a week and the eggs taken out.

The third method uses a tank with a layer of gravel for the spawners to deposit their eggs. The eggs are removed weekly by stirring up the gravel and scooping up the eggs, or by using a suction-type gravel cleaner to siphon out the eggs.

While all of these methods work, removal of the eggs is time consuming. Like most killifish, these fishes produce only a few eggs per female per day. There are also times, for reasons not understood, that they stop spawning altogether. During these lulls, the culturist will go through the trouble of breaking down the tank to look for eggs, only to find that few if any eggs were produced. All of these problems can be reduced or eliminated with the use of an Aquatic Animal Egg Collection Apparatus.

When spawning *Lamprichthys tanganicanus*, the rectangular Egg Collector container was the best embodiment. Instead of the screened covering, small rocks were placed directly in the V shaped collecting surface. It was important to place the rocks so there were gaps between them and no pockets where the eggs can hang-up. The apparatus was placed at one end of a large, bare tank (no gravel). A box, sponge or power filter was then placed at the opposite end of the tank for filtration. When the fishes spawned, the eggs were channeled into the egg collector, then into the egg transporter tube and finally into the egg concentrator container. The culturist can easily tell when the fishes spawn and easily remove the eggs.

Example 9

In designing and fine-tuning the Aquatic Animal Egg Collection Apparatus, several conflicting requirements had to be balanced. The angle of the sloped surfaces of the Egg Collector needed to be as steep as possible to facilitate the movement of the eggs to the bottom. Since most fishes spawn near the bottom and since most aquaria are relatively shallow, it was important that the Egg Collector not rise too high off the bottom of the tank. Another consideration was the size of the spawning area. In order to collect as many eggs as possible, it was important that the spawning area be as large as possible. If the angle was too steep, the Egg Collector would be too high, and the spawning area too small. Conversely, if the spawning area was large, and the device was made low, the angle of the egg collector apparatus' surface was too gentle and the eggs would not roll down to the bottom.

Example 10

The Egg Concentrator apparatus had its own unique design requirements. The Egg Concentrator apparatus had to be large enough to provide some dead space to allow the eggs to settle out. If the concentrator was too small, the eggs would be constantly agitated, causing damage to the eggs. On the other hand, the concentrator could not be too large and unwieldy, because it had to be attached to the egg transporter tube. The concentrator also had to trap the eggs while allowing the excess air and water to escape.

Two different designs were tested. In the first design, a hole was drilled through the side of a small plastic tube, and a short length of rigid tubing inserted and firmly glued with silicone sealant. This provided the means to attach the concentrator to the end of the egg transporter tube. A second hole was drilled through the cover and another short piece of rigid tubing was attached to allow the release of excess air. Two holes were drilled through the side and covered by NITEX. This allowed the excess water to escape while retaining the eggs. A clear plastic tube was used in the second design. The egg concentrator was placed directly on the upright section of the egg transporter tube. The concentrator extends to the surface of the water. In use, the excess air escaped directly through the open end of the collector.

It is to be understood that the foregoing descriptions are exemplary and explanatory in nature, and are intended to illustrate the invention and its preferred embodiments. Through routine experimentation, the artisan will recognize apparent modifications and variations that may be made without departing from the spirit of the invention. Therefore, it should be clearly understood that the forms of the present invention are illustrative only and are not intended to limit the scope of the present invention. All references cited herein are hereby expressly incorporated by reference.

What is claimed is:

1. An Aquatic Animal Egg Collection Apparatus comprising:
    an egg collector apparatus adapted to collect negative-buoyant aquatic eggs, connected to
    an egg transporter apparatus, which in turn is connected to
    an egg concentrator apparatus.

2. The Aquatic Animal Egg Collection Apparatus of claim 1, further comprising;
    the egg collector apparatus having
        an inner surface,
        an outer surface,
        a proximal end at the zenith of the egg collector apparatus with an edge around a first opening, and
        a distal end at the nadir of the egg collector apparatus with an edge around a second opening,
        and with the first opening at the proximal end oriented to collect released aquatic animal eggs, and
        with the inner surface sloping from the zenith of the egg collector apparatus at the proximal end, to the nadir of the egg collector apparatus at the distal end, and
        with the distal end of the egg collector apparatus connected to;
    the egg transporter apparatus having
        a first hollow tube with
            a proximal end and a distal end, and
            with the proximal end attached to the distal end of the egg collector;
        and a second hollow tube with
            a proximal end and a distal end,
            with the proximal end inserted into the first hollow tube, and
            the distal end connected to a propulsion device;
        and the distal end of the first hollow tube connected to;
    the egg concentrator apparatus having a container with a first opening for the insertion of the distal end of the egg transporter apparatus, and with a second opening to allow water to escape.

3. The Aquatic Animal Egg Collection Apparatus of claim 2, wherein the egg collector apparatus, the egg transporter apparatus, and the egg concentrator apparatus are constructed as one piece.

4. The Aquatic Animal Egg Collection Apparatus of claim 2,
wherein the shape of the edge around the opening at the proximal end at the zenith of the egg collector apparatus is selected from the group consisting of regular polygon, irregular polygon, round, oval and curved.

5. The Aquatic Animal Egg Collection Apparatus of claim 2,
wherein the shape of the egg collector apparatus is selected from the group consisting of box, cube, prism, polyhedron, pyramid, cylinder, cone, and sphere; and inversions, angles from vertical and portions thereof.

6. The Aquatic Animal Egg Collection Apparatus of claim 2, further comprising a structure, which is heavier than water, attached to the egg collector apparatus.

7. The Aquatic Animal Egg Collection Apparatus of claim 2,
wherein the egg collector has an inner surface and the inner surface of the egg collector apparatus is angled from more than 0° to about 90°.

8. The Aquatic Animal Egg Collection Apparatus of claim 7,
wherein the inner surface of the egg collector apparatus is angled from more than 30° to less than 60°.

9. The Aquatic Animal Egg Collection Apparatus of claim 8,
wherein the inner surface of the egg collector apparatus is angled at about 45°.

10. The Aquatic Animal Egg Collection Apparatus of claim 1,
further comprising a propulsion device adapted to transport negative-buoyant aquatic eggs connected to the egg transporter apparatus and the propulsion device is selected from the group consisting of air pump, water pump with expulsion, water pump with suction, and gravitational flow.

11. An Aquatic Animal Egg Collection Apparatus comprising:
a means for collecting a negative buoyant aquatic animal egg,
connected to a means for transporting the negative buoyant aquatic animal egg, and this in turn is connected to a means for concentrating the negative buoyant aquatic animal egg.

12. The Aquatic Animal Egg Collection Apparatus of claim 11 further comprising:
a means for causing the movement of the negative buoyant aquatic animal egg along the means for the transporting the negative buoyant aquatic animal egg.

13. A method of collecting an aquatic animal egg with the Aquatic Animal Egg Collection Apparatus of claim 1 comprising;
placing an aquatic animal to release an egg in an aquatic animal rearing container containing water,
placing the egg collector apparatus of the Aquatic Animal Egg Collection Apparatus in the aquatic animal rearing container in a location conducive to egg release,
positioning in the aquatic animal rearing container the egg collector apparatus to enable collecting of the released aquatic animal egg,
propelling the egg from the egg collector apparatus through the egg transporter apparatus to the egg concentrator apparatus, and
placing the egg in the egg concentrator apparatus.

14. The method of collecting aquatic animal eggs of claim 13,
wherein the aquatic animal rearing container is selected from the group consisting of aquarium, bucket, tank, raceway, pond, and lake.

15. The method of collecting aquatic animal eggs of claim 13, wherein the aquatic animal is an ornamental fish species.

* * * * *